(12) United States Patent
Kim

(10) Patent No.: US 11,769,267 B2
(45) Date of Patent: Sep. 26, 2023

(54) OBJECT DISTANCE MEASUREMENT APPARATUS AND METHOD

(71) Applicant: HYUNDAI MOBIS CO., LTD., Seoul (KR)

(72) Inventor: Kee-Beom Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 408 days.

(21) Appl. No.: 16/908,084

(22) Filed: Jun. 22, 2020

(65) Prior Publication Data

US 2020/0402249 A1 Dec. 24, 2020

(30) Foreign Application Priority Data

Jun. 24, 2019 (KR) .................. 10-2019-0074848

(51) Int. Cl.
*G06T 7/579* (2017.01)
*G01S 17/86* (2020.01)
*G01S 17/931* (2020.01)
*G05D 1/02* (2020.01)

(52) U.S. Cl.
CPC .............. *G06T 7/579* (2017.01); *G01S 17/86* (2020.01); *G01S 17/931* (2020.01); *G05D 1/024* (2013.01); *G05D 1/0253* (2013.01); *G05D 2201/0213* (2013.01); *G06T 2207/30261* (2013.01)

(58) Field of Classification Search
CPC .................................................... G06T 7/579
USPC ......................................................... 382/103
See application file for complete search history.

(56) References Cited

U.S. PATENT DOCUMENTS

2016/0039436 A1* 2/2016 Bhagwatkar ........ B61L 15/0027
348/148

FOREIGN PATENT DOCUMENTS

KR 10-2018-0126224 A 11/2018

OTHER PUBLICATIONS

You Li, "Stereo vision and LIDAR based Dynamic occupancy Grid mapping: Application to scenes analysis for Intelligent Vehicles," Computers and Society, Universite de Technologie de Belfort-Montbeliard, 2013, 177 pp., NNT:2013BELF0225.

* cited by examiner

*Primary Examiner* — Yulin Sun
(74) *Attorney, Agent, or Firm* — MORGAN, LEWIS & BOCKIUS LLP

(57) ABSTRACT

An object distance measurement apparatus may include: a camera to capture an image of an area around a vehicle; a distance sensor to detect a distance from an object by scanning around the vehicle; and a distance measurement unit that detects a vehicle moving distance using vehicle information generated by operation of the vehicle, and measures the distance from the object in response to each of frames between scan periods of the distance sensor, among frames of the image, based on the vehicle moving distance and the location pixel coordinates of the object within the images before and after the vehicle moves.

20 Claims, 8 Drawing Sheets

FIG.5

| Classification | Steering Angle(θ) | Radius(r) |
|---|---|---|
| 1 | θ1 | r1 |
| 2 | θ2 | r2 |
| 3 | θ3 | r3 |
| ... | ... | ... |

Left view    Right view

OBJECT DISTANCE MEASUREMENT APPARATUS AND METHOD

CROSS-REFERENCE TO RELATED APPLICATION

This application claims priority to and the benefit of Korean Patent Application No. 10-2019-0074848, filed on Jun. 24, 2019, the entire contents of which are incorporated herein by reference.

FIELD

Exemplary forms of the present disclosure relate to an object distance measurement apparatus and method thereof.

BACKGROUND

The statements in this section merely provide background information related to the present disclosure and may not constitute prior art.

In these days, the application of intelligent systems to vehicles is rapidly increasing thanks to development of electronics technologies and to satisfy traffic safety-related regulations and demands of consumers. Various types of ADASs (Advanced Driver Assistance Systems) are applied to improve safety/convenience of drivers. Examples of the ADAS include a front/rear monitoring camera system to secure driving vision, a system for warning lane departure, and a system for automatically securing a safety distance from a forward vehicle. Furthermore, an active safety system for a vehicle automatically operates a brake device to prevent a forward collision or reduce collision damage, when the forward collision is predicted. The active safety system uses the advanced sensor recognition technology. Furthermore, due to the autonomous driving technology which attracts attention in automobile fields, much attention is recently paid to the recognition technology.

In general, a conventional object sensor is configured as an ultrasonic sensor and mounted in front and rear bumpers of a vehicle. The object sensor may sense an object within a predetermined distance, and output a warning sound, in order to prevent a collision between the object and the vehicle.

Conventionally, various methods for measuring the distance from a vehicle to an object have been disclosed. Examples of the various methods may include a method for measuring a distance from a vehicle to an object by processing images captured through a stereo camera or a method for measuring a distance from a vehicle to an object in response to the size of the object in an image captured through a single camera. However, users do not want to install the stereo camera which is expensive and difficult to maintain, in order to simply measure only a distance. Furthermore, in order to measure a distance in response to the size of an object, a large-capacity database needs to be constructed for accurate recognition of the object.

The related art of the present disclosure is disclosed in Korean Patent Pub. No. 10-2018-0126224 published on Nov. 27, 2018 and entitled "Vehicle Handling Methods and Devices during Vehicle Driving".

SUMMARY

Various forms are directed to an object distance measurement apparatus and method which can interpolate insufficient distance information due to a difference in refresh rate between image information acquired through a camera and lidar information acquired through a lidar sensor, by applying vehicle operation information to epipolar geometry.

In one form, an object distance measurement apparatus may include: a camera configured to capture an image of an area around a vehicle; a distance sensor configured to detect a distance from the vehicle to an object by scanning around the vehicle; and a distance measurement unit that detects a vehicle moving distance using vehicle information generated by operation of the vehicle, and measures the distance from the object in response to each of frames among frames of the captured image between scan periods of the distance sensor, based on the vehicle moving distance and location pixel coordinates of the object within captured images before and after the vehicle moves.

The object distance measurement apparatus may further include a determination unit configured to compare a camera frequency of the camera with a scan frequency of the distance sensor, and determine whether to interpolate the distance from the object for each of the frames of the image.

The vehicle information may include at least one of a vehicle moving distance, a steering angle, a vehicle speed or a travel time.

The object distance measurement apparatus may further include a mapping unit configured to map the distance from the object, corresponding to each of the frames between the scan periods of the distance sensor among the frames of the image, to each of the frames between the scan periods of the distance sensor.

In order to calculate the distance from the object, the distance measurement unit may calculate the vehicle moving distance based on a moving distance, a steering angle and a moving angle among the pieces of vehicle information, received from an ECU (Electronic Control Unit) of the vehicle. The vehicle moving distance may be the length of a straight line connecting a first location of the vehicle before the vehicle starts to move to a second location of the vehicle after the vehicle has moved.

In order to calculate the distance from the object, the distance measurement unit may generate a first virtual triangle that includes a first side corresponding to the calculated vehicle moving distance and a second side corresponding to the radius of a virtual circle that corresponds to a circular arc along which the vehicle moves. The moving angle may be decided according to the length and radius of the circular arc along which the vehicle moves, and the radius may be decided according to the steering angle and previously stored in the form of a table in an internal memory.

The first virtual triangle may be a virtual triangle whose apexes respectively correspond to the location of the camera before the vehicle moves, the location of the camera after the vehicle moves, and the location of a contact point between parallel lines tangent to a bumper of the vehicle before the movement and the bumper of the vehicle after the movement, when the parallel lines are extended toward the inside of the steering angle. In particular, the inside of the steering angle corresponds to the inside of the virtual circle when the vehicle moves in a circular arc shape.

When the first virtual triangle is generated, the distance measurement unit may generate a second virtual triangle that shares one side with the first virtual triangle, in order to calculate the distance from the object based on the information of the first virtual triangle.

The second virtual triangle may share one side corresponding to a straight line connecting the locations of the camera of the vehicle before and after the vehicle moves, among the three sides forming the first virtual triangle, and the second virtual triangle may be a virtual triangle whose apexes are set to the location of the camera before the vehicle moves, the location of the camera after the vehicle moves, and the center location of the object corresponding to a distance measurement target.

The distance measurement unit may calculate the lengths of two sides forming the second virtual triangle by applying the locations of the object in the images, captured by the camera before and after the vehicle moves, to an epipolar geometry, and the distance measurement unit may calculate, as the distance from the object, the length of a side corresponding to a straight line connecting the center location of the object to the location of the camera after the vehicle moves, among the three sides forming the second virtual triangle.

In one form, the distance sensor may be a lidar sensor.

In another form, an object distance measurement method may include: capturing, by a camera, an image of an area around a vehicle; sensing, by a distance sensor, a distance from an object by scanning around the vehicle; and detecting, by a distance measurement unit, a vehicle moving distance using vehicle information generated by operation of the vehicle, and measuring the distance from the object in response to each of frames between scan periods of the distance sensor, among frames of the image, based on the vehicle moving distance and the location pixel coordinates of the object within the captured images before and after the vehicle moves.

The object distance measurement apparatus and method in accordance with the form of the present disclosure may apply vehicle operation information to epipolar geometry to interpolate insufficient distance information due to a difference in refresh rate between image information acquired through the camera and lidar information acquired through the lidar sensor. Thus, the object distance measurement apparatus and method can conveniently measure a distance from an object at low cost, and acquire the effect of a stereo camera using one camera.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 is a diagram for describing a method for generating the first virtual triangle using a steering angle and radius information in one form of the present disclosure;

Figure 1:
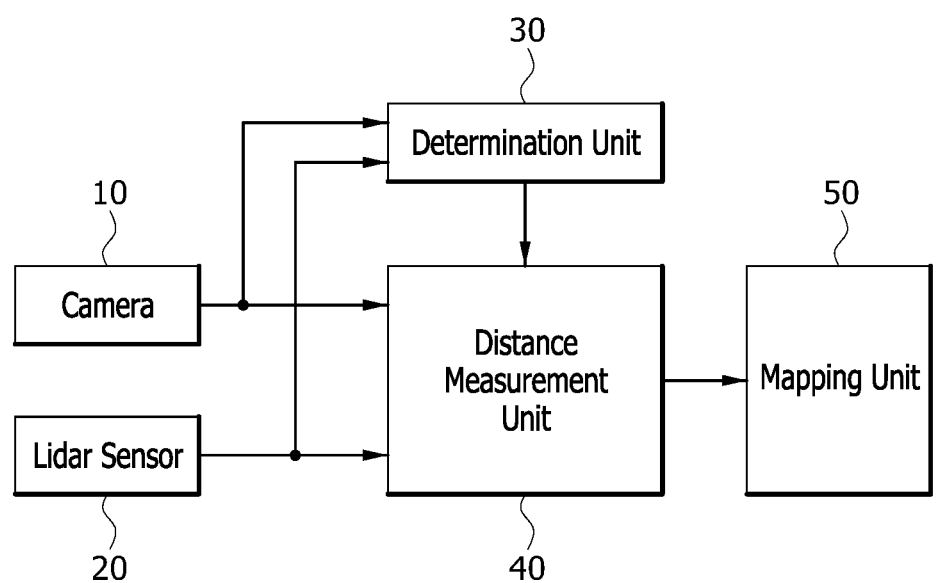
FIG. 1 is a block diagram illustrating an object distance measurement apparatus in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, an object distance measurement apparatus and method will be described below with reference to the accompanying drawings through various exemplary forms.

It should be noted that the drawings are not to precise scale and may be exaggerated in thickness of lines or sizes of components for descriptive convenience and clarity only. Furthermore, the terms as used herein are defined by taking functions of the present disclosure into account and can be changed according to the custom or intention of users or operators. Therefore, definition of the terms should be made according to the overall disclosures set forth herein.

As publicly known in the art, some of exemplary forms may be illustrated in the accompanying drawings from the viewpoint of function blocks, units and/or modules. Those skilled in the art will understood that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification. Furthermore, each of the blocks, units and/or modules may be implemented by dedicated hardware or a combination of dedicated hardware for performing some functions and a processor for performing another function (for example, one or more programmed processors and related circuits). In some exemplary forms, each of the blocks, units and/or modules may be physically divided into two or more blocks, units and or modules which are interactive and discrete, without departing from the scope of the disclosure. Furthermore, blocks, units and/or modules in some exemplary forms may be physically coupled as a more complex block, unit and/or module without departing from the scope of the disclosure.

Figure 2:
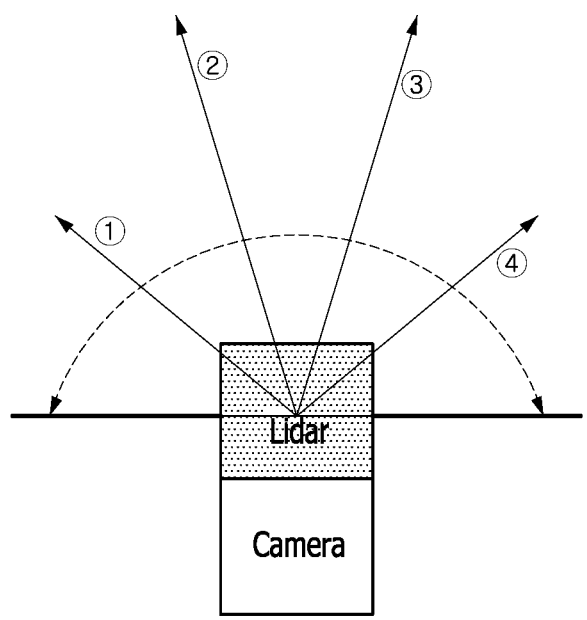
FIG. 2 is a diagram illustrating a scan method of a lidar sensor in a shooting area of a camera in one form of the present disclosure.
Figure 3:
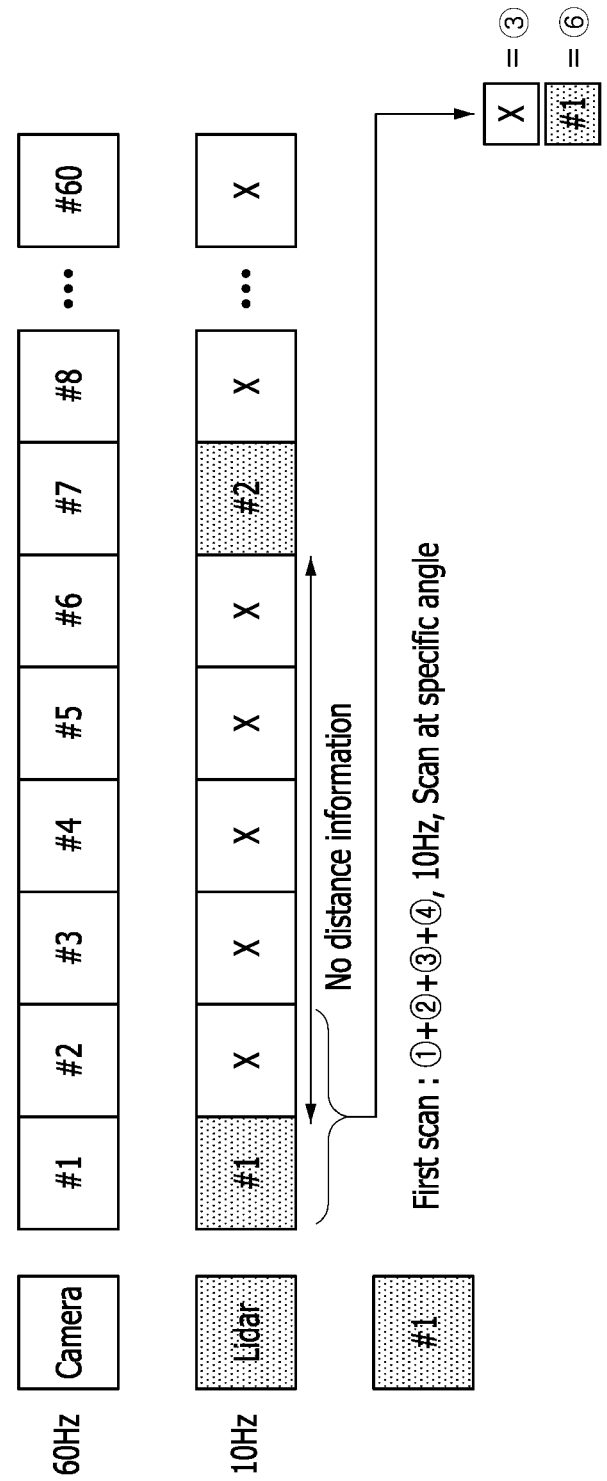
FIG. 3 is a diagram illustrating insufficient distance information due to a difference in refresh rate between image information and lidar information acquired through the lidar sensor in one form of the present disclosure.
Figure 4:
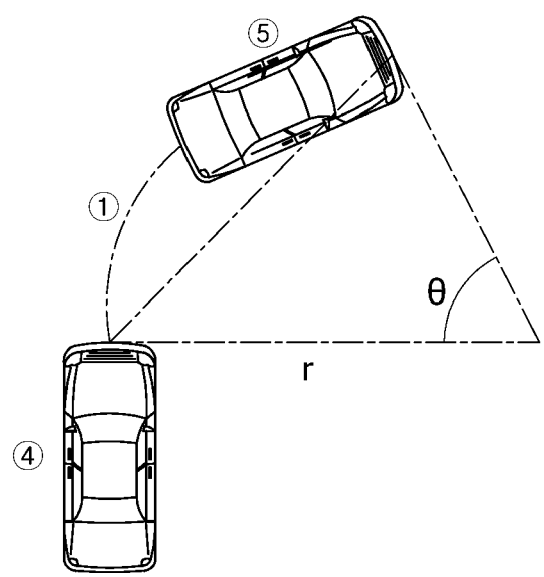
FIG. 4 is a diagram for describing a method for generating a first virtual triangle by calculating a vehicle moving distance in one form of the present disclosure.
Figure 6A:
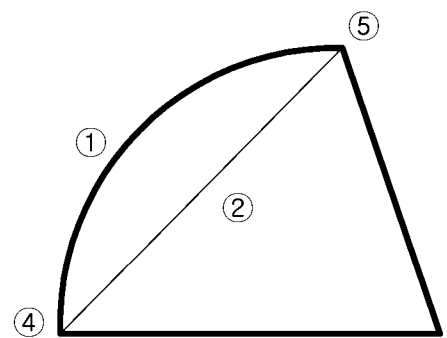
FIGS. 6A and 6B are diagrams for describing a method for generating a second virtual triangle for calculating a distance from an object in one form of the present disclosure.
Figure 6B:
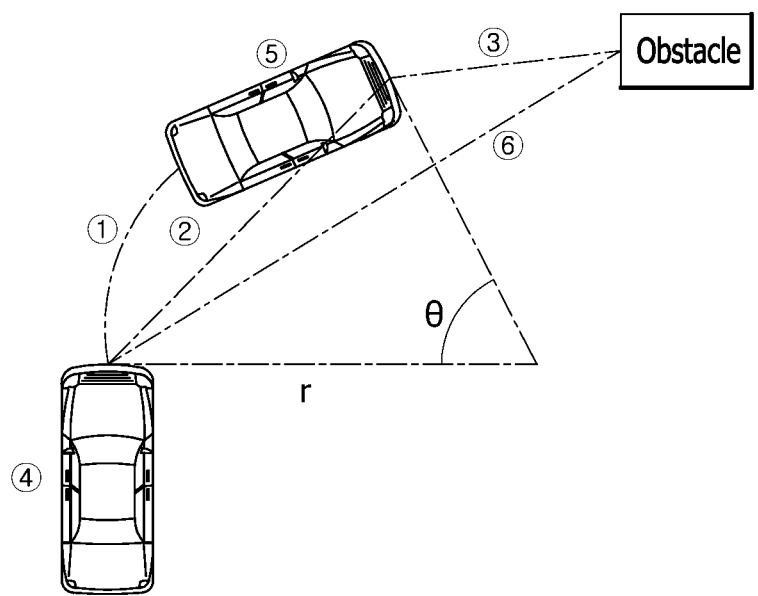
Figure 7:
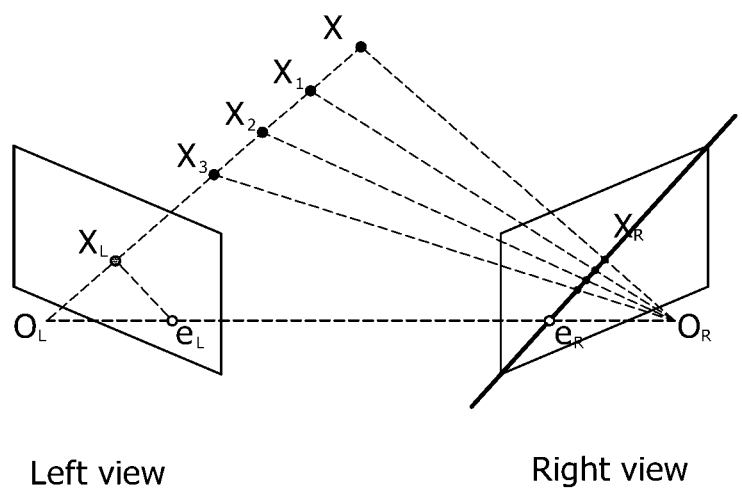
FIG. 7 is a diagram for describing a method for calculating a distance from an object based on the epipolar geometry and the second virtual triangle in one form of the present disclosure.

FIG. 1 is a block diagram illustrating an object distance measurement apparatus in one form of the present disclosure, FIG. 2 is a diagram illustrating a scan method of a lidar sensor in a shooting area of a camera in one form of the present disclosure, FIG. 3 is a diagram illustrating insufficient distance information due to a difference in refresh rate between image information and lidar information acquired through the lidar sensor in one form of the present disclosure, FIG. 4 is a diagram for describing a method for generating a first virtual triangle by calculating a vehicle moving distance in one form of the present disclosure, FIG. 5 is a diagram for describing a method for generating the first virtual triangle using a steering angle and radius information in one form of the present disclosure, FIGS. 6A and 6B are diagrams for describing a method for generating a second virtual triangle for calculating a distance from an object in one form of the present disclosure, and FIG. 7 is a diagram for describing a method for calculating a distance from an object based on the epipolar geometry and the second virtual triangle in one form of the present disclosure.

Referring to FIG. 1, the object distance measurement apparatus includes a camera 10, a lidar sensor 20, a determination unit 30, a distance measurement unit 40 and a mapping unit 50.

The camera 10 is installed in a vehicle to capture an image of a forward area of the vehicle. The camera 10 may acquire 60 frames per second at a camera frequency of 60 Hz, for example. For reference, in the present form, it has been described that 60 frames are acquired at a camera frequency of 60 Hz, but the present disclosure is not limited thereto. For example, a camera with a camera frequency of 30 Hz can be used as the camera 10.

The lidar sensor 20 measures a distance from an object by emitting laser to the forward area of the vehicle and receiving the laser reflected and returning from the object.

The lidar sensor 20 includes a transmitting unit (not illustrated) for emitting laser to the forward area of the vehicle, a rotating unit (not illustrated) for rotating the transmitting unit by a preset angle, a receiving unit (not illustrated) for receiving the laser reflected and returning from the object after the laser is emitted by the transmitting unit, and a distance measurer (not illustrated) for measuring the distance from the object ahead of the vehicle using a time difference between the time point that the laser is emitted by the transmitting unit and the time point that the laser is received by the receiving unit, when the laser is received by the receiving unit.

The lidar sensor 20 emits laser to a shooting area which is covered by the camera 10. Referring to FIG. 2, the lidar sensor 20 may emit laser to the shooting area in which an image is captured by the camera 10. In this case, the lidar sensor 20 may be rotated (①, ②, ③, and ④) by the preset angle with respect to the shooting area, in order to measure a distance from an object present in the shooting area. The lidar sensor 20 scans the object at a scan frequency of 10 Hz.

When the camera 10 acquires an image at a camera frequency of 60 Hz and the lidar sensor 20 scans an object at a scan frequency of 10 Hz, a first frame, a seventh frame, a 13th frame, a 19th frame, a 25th frame, a 31st frame, a 37th frame, a 43rd frame and a 55th frame, the frames of the camera 10 may be mapped to scan data (distance from the object) of the lidar sensor 20, but the other frames may not be mapped to the scan data of the lidar sensor 20, as illustrated in FIG. 3.

That is, frames of the camera 10 between scan periods of the lidar sensor 20, i.e. second to sixth frames, eighth to 12th frames, 14th to 18th frames, 20th to 24th frames, 26th to 30th frames, 32nd to 36th frames, 38th to 42nd frames, 44th to 48th frames, 50th to 54th frames and 56th to 60th frames, may not be mapped to the scan data. As a result, the corresponding frames have no information on the distance from the object.

Thus, based on a vehicle moving distance and the location pixel coordinates of the object in images before and after the vehicle moves, the distance measurement unit 40 measures the distance from the object in response to each of the frames between scan periods of the lidar sensor 20, i.e. the second to sixth frames, the eighth to 12th frames, the 14th to 18th frames, the 20th to 24th frames, the 26th to 30th frames, the 32nd to 36th frames, the 38th to 42nd frames, the 44th to 48th frames, the 50th to 54th frames and the 56th to 60th frames, among the frames of the image.

Before the distance measurement, the determination unit 30 compares the camera frequency of the camera 10 and the scan frequency of the lidar sensor 20, and determines whether to interpolate the distance from the object for each frame of the image.

That is, when an image is captured by the camera 10 and the object is scanned by the lidar sensor 20, the determination unit 30 compares the camera frequency of the camera 10 and the scan frequency of the lidar sensor 20, and determines whether to interpolate the distance from the object according to whether the camera frequency of the camera 10 and the scan frequency of the lidar sensor 20 coincide with each other. For example, when the camera frequency of the camera 10 and the scan frequency of the lidar sensor 20 are different from each other, the determination unit 30 decides to interpolate the distance from the object for each of the frames between the scan periods of the lidar sensor 20, among the frames of the image.

When the determination unit 30 decides to interpolate the distance from the object for each of the frames between the scan periods of the lidar sensor 20 among the frames of the image, the distance measurement unit 40 detects a vehicle moving distance using vehicle information generated by the operation of the vehicle, and measures the distance from the object in response to each of the frames between the scan periods of the lidar sensor 20 among the frames of the image, based on the vehicle moving distance and the location pixel coordinates of the object in the image before and after the vehicle moves.

More specifically, the distance measurement unit 40 selects the location pixel coordinate of the object in the image in order to measure the distance from the object in the image, and the corresponding object may be an area measured by the lidar sensor 20.

When the object is selected, the distance measurement unit 40 receives vehicle information (for example, moving distance, steering angle, vehicle speed, travel time and the like), which is generated by the operation of the vehicle, through communication with an ECU (Electronic Control Unit) in the vehicle.

The distance measurement unit 40 receives the vehicle information (for example, moving distance and steering angle information), and generates a virtual triangle (first virtual triangle) for calculating the distance from the object, i.e. the distance from the camera 10 of the vehicle to the object, as illustrated in FIG. 4.

At this time, the length r of one side for generating the virtual triangle (first virtual triangle) or the radius of a virtual circle corresponding to a circular arc along which the vehicle moves according to a steering angle may be predetermined according to the steering angle, and stored in the form of a table in an internal memory (not illustrated). As illustrated in FIG. 5, a moving angle θ is decided according to the length and radius r of the circular arc along which the vehicle moves.

When the steering angle is detected, the length r of one side for generating the virtual triangle (first virtual triangle) or the radius of the virtual circle corresponding to the circular arc along which the vehicle moves according to the steering angle may also be calculated through a preset specific equation.

Therefore, the apexes of the virtual triangle (first virtual triangle) are set to the location of the camera 10 before the vehicle moves, the location of the camera 10 after the vehicle moves, and the location of the contact point between parallel lines tangent to a bumper of the vehicle before the movement and the bumper of the vehicle after the movement, respectively, when the parallel lines are extended toward the inside of the steering angle (i.e. the inside of the circular arc along which the vehicle moves).

The distance measurement unit 40 may generate the virtual triangle (first virtual triangle) with the three apexes, and thus calculate the lengths of three sides of the virtual triangle (first virtual triangle). In particular, the distance measurement unit 40 may calculate the length of a side (②) of FIG. 6) corresponding to a straight line connecting the location of the camera 10 of the vehicle before the movement to the location of the camera 10 of the vehicle after the movement, and generate another virtual triangle (second virtual triangle) whose one side is set to the side (②) of FIG. 6) corresponding to the straight line connecting the location of the camera 10 of the vehicle before the movement to the location of the camera 10 of the vehicle after the movement.

The apexes of the another virtual triangle (second virtual triangle) are set to the location of the camera 10 before the vehicle moves, the location of the camera 10 after the vehicle moves, and the center location of the object (see FIG. 6B). That is, the another virtual triangle (second virtual triangle) is formed by three sides (②, ③ and ⑥ of FIG. 6).

Among the three sides (②, ③ and ⑥ of FIG. 6) of the second virtual triangle, the length of a side (③ of FIG. 6) corresponding to a straight line, which connects the center location of the object to the location of the camera 10 after the vehicle moves, becomes the distance from the object, i.e. the distance from the camera 10 of the vehicle to the object.

At this time, the length of the side (② of FIGS. 6A and 6B) among the three sides (②, ③ and ⑥ of FIGS. 6A and 6B) of the second virtual triangle is already known information, and the lengths of the other two sides (③ and ⑥ of FIG. 6B) may be calculated by applying the locations of the object in the images, captured by the camera 10 before and after the vehicle moves, to the epipolar geometry (see FIG. 7).

Since the epipolar geometry is a publicly known technology, the detailed descriptions thereof will be omitted herein. For reference, in FIG. 7, $O_R$ represents the location of the camera 10 before the vehicle moves, $O_L$ represents the location of the camera 10 after the vehicle moves, and X (or $X_1$ to $X_L$) represents the center location of the object. Furthermore, a right view represents an image captured by the camera 10 before the vehicle moves, and a left view represents an image captured by the camera 10 after the vehicle moves.

In FIGS. 4 and 6A-6B, the magnitude of the steering angle at which the vehicle moves in a circular arc shape is exaggerated, for convenience of description. In reality, since a user continuously operates a steering wheel during reverse driving, the steering angle will be continuously changed while the vehicle moves. Therefore, it should be understood that FIGS. 4 and 6A-6B are based on the supposition that the steering angle is not changed but maintained while the vehicle moves, in order to promote understanding.

As such, the process of measuring a distance from an object is performed for each frame. For example, when the second frame is acquired through the vehicle information in a state where the first frame acquired by the camera 10 and first scan data are acquired, the distance measurement unit 40 performs the above-described process to acquire a distance from the object, corresponding to the second frame, based on a vehicle moving distance. By repeatedly performing such a process until the next scan data is acquired, the distance measurement unit 40 acquires a distance from the object, corresponding to each of the frames between the scan periods, i.e. the second to sixth frames, the eighth to 12th frames, the 14th to 18th frames, the 20th to 24th frames, the 26th to 30th frames, the 32nd to 36th frames, the 38th to 42nd frames, the 44th to 48th frames, the 50th to 54th frames and the 56th to 60th frames.

As the distance measurement unit 40 measures the distance from the object in response to each of the frames between the scan periods of the lidar sensor 20, among the frames of the image, the mapping unit 50 maps the distance from the object one-to-one to each of the frames between the scan periods of the lidar sensor 20, among the frames of the image.

Therefore, the distance from the object for each of the first to 60th frames acquired by the camera 10 may be acquired.

Hereafter, an object distance measurement method in one form of the present disclosure will be described in detail with reference to FIG. 8.

Figure 8:
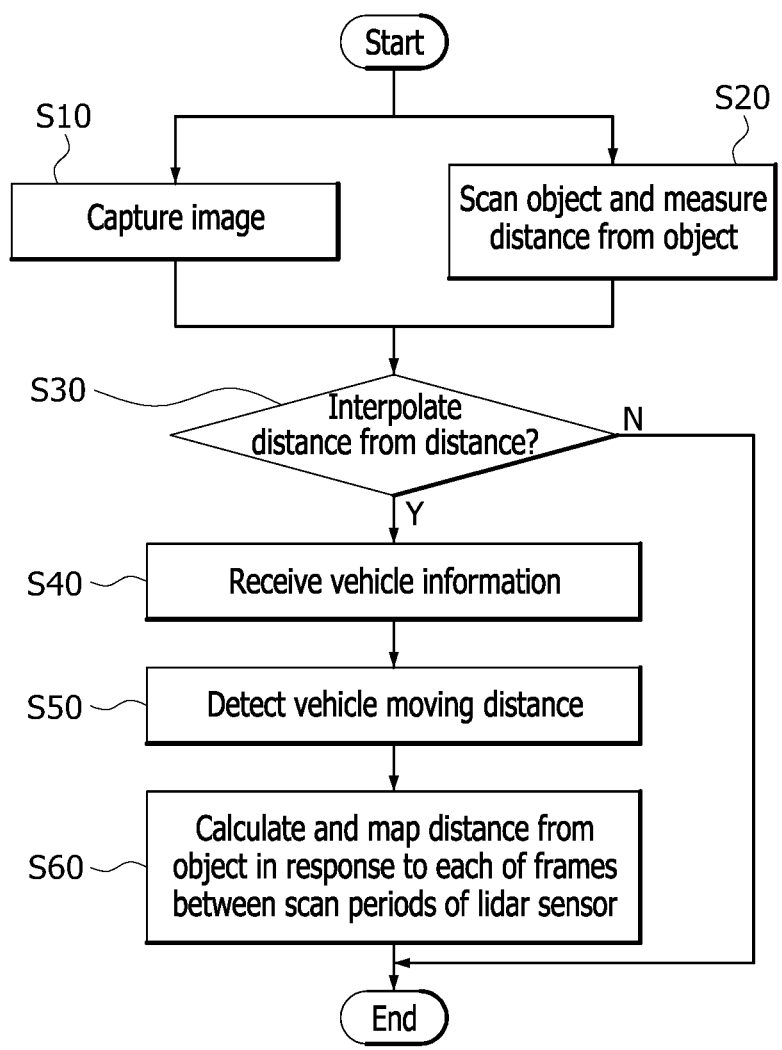
FIG. 8 is a flowchart illustrating an object distance measurement method in another form of the present disclosure.

FIG. 8 is a flowchart illustrating an object distance measurement method in another form of the present disclosure.

Referring to FIG. 8, the camera 10 captures an image of a forward area of the vehicle in step S10. The camera 10 may acquire 60 frames per second at a camera frequency of 60 Hz, for example.

The lidar sensor 20 measures a distance from an object by emitting laser to the forward area of the vehicle and receiving the laser reflected and returning from the object, in step S20.

As the image is captured by the camera 10 and the distance from the object is measured by the lidar sensor 20, the determination unit 30 compares the camera frequency of the camera 10 to the scan frequency of the lidar sensor 20, and determines whether to interpolate the distance from the object for each frame of the image, in step S30.

In this case, when the comparison result indicates that the camera frequency of the camera 10 and the scan frequency of the lidar sensor 20 are different from each other, the determination unit 30 decides to interpolate the distance from the object for each of the frames between the scan periods of the lidar sensor 20, among the frames of the image.

When the determination unit 30 decides to interpolate the distance from the object for each of the frames between the scan periods of the lidar sensor 20 among the frames of the image, the distance measurement unit 40 selects the location pixel coordinate of the object within the image in order to measure the distance in the image, and receives vehicle information (for example, moving distance, steering angle, vehicle speed and travel time), which is generated by the operation of the vehicle, through communication with the ECU within the vehicle, in step S40.

Then, as illustrated in FIG. 4, the distance measurement unit 40 generates a virtual triangle (first virtual triangle) for calculating the distance between the vehicle and the object (i.e. the distance from the camera 10 of the vehicle to the object), based on the received vehicle information (for example, moving distance and steering angle information).

At this time, the length r of one side for generating the virtual triangle (first virtual triangle) or the radius of a virtual circle corresponding to a circular arc along which the vehicle moves according to the steering angle may be predetermined according to the steering angle, and stored in the form of a table in the internal memory (not illustrated). As illustrated in FIG. 5, the moving angle θ is decided according to the length and radius r of the circular arc along which the vehicle moves.

When the steering angle is detected, the length r of one side for generating the virtual triangle (first virtual triangle) or the radius of the virtual circle corresponding to the circular arc along which the vehicle moves according to the steering angle may also be calculated through a preset specific equation.

Therefore, the apexes of the virtual triangle (first virtual triangle) are set to the location of the camera 10 before the vehicle moves, the location of the camera 10 after the vehicle moves, and the location of the contact point between parallel lines tangent to a bumper of the vehicle before the movement and the bumper of the vehicle after the movement, respectively, when the parallel lines are extended toward the inside of the steering angle (i.e. the inside of the circular arc along which the vehicle moves).

The distance measurement unit 40 may generate the virtual triangle (first virtual triangle) with the three apexes, and thus calculate the lengths of three sides of the virtual triangle (first virtual triangle). In particular, the distance measurement unit 40 may calculate the length of a side (②) of FIGS. 6A-6B) corresponding to a straight line connecting the location of the camera 10 of the vehicle before the movement to the location of the camera 10 of the vehicle after the movement, and generate another virtual triangle (second virtual triangle) whose one side is set to the side (②) of FIGS. 6A-6B) corresponding to the straight line connecting the location of the camera 10 of the vehicle before the movement to the location of the camera 10 of the vehicle after the movement.

The apexes of the another virtual triangle (second virtual triangle) are set to the location of the camera 10 before the vehicle moves, the location of the camera 10 after the vehicle moves, and the center location of the object (see FIG. 6B). That is, the another virtual triangle (second virtual triangle) is formed by three sides (②, ③ and ⑥) of FIG. 6B).

Among the three sides (②, ③ and ⑥ of FIG. 6B) of the second virtual triangle, the length of a side (③ of FIG. 6B) corresponding to a straight line, which connects the center location of the object to the location of the camera 10 after the vehicle moves, becomes the distance from the object, i.e. the distance from the camera 10 of the vehicle to the object.

At this time, the length of the side (② of FIGS. 6A-6B) among the three sides (②, ③ and ⑥ of FIGS. 6A-6B) of the second virtual triangle is already known information, and the lengths of the other two sides (③ and ⑥ of FIG. 6B) may be calculated by applying the locations of the object in the images, captured by the camera 10 before and after the vehicle moves, to the epipolar geometry (see FIG. 7), in step S50.

Since the epipolar geometry is a publicly known technology, the detailed descriptions thereof will be omitted herein. For reference, in FIG. 7, $O_R$ represents the location of the camera 10 before the vehicle moves, $O_L$ represents the location of the camera 10 after the vehicle moves, and X (or $X_1$ to $X_L$) represents the center location of the object. Furthermore, the right view represents an image captured by the camera 10 before the vehicle moves, and the left view represents an image captured by the camera 10 after the vehicle moves.

In FIGS. 4 and 6A-6B, the magnitude of the steering angle at which the vehicle moves in a circular arc shape is exaggerated, for convenience of description. In reality, since a user continuously operates a steering wheel during reverse driving, the steering angle will be continuously changed while the vehicle moves. Therefore, it should be understood that FIGS. 4 and 6A-6B are based on the supposition that the steering angle is not changed but maintained while the vehicle moves, in order to promote understanding.

As such, the process of measuring a distance from an object is performed for each frame. For example, when the second frame is acquired through the vehicle information in a state where the first frame acquired by the camera 10 and first scan data are acquired, the distance measurement unit 40 performs the above-described process to acquire a distance from the object, corresponding to the second frame, based on a vehicle moving distance. By repeatedly performing such a process until the next scan data is acquired, the distance measurement unit 40 acquires a distance from the object, corresponding to each of the frames between the scan periods, i.e. the second to sixth frames, the eighth to 12th frames, the 14th to 18th frames, the 20th to 24th frames, the 26th to 30th frames, the 32nd to 36th frames, the 38th to 42nd frames, the 44th to 48th frames, the 50th to 54th frames and the 56th to 60th frames.

As the distance measurement unit 40 measures the distance from the object in response to each of the frames between the scan periods of the lidar sensor 20, among the frames of the image, the mapping unit 50 maps the distance from the object one-to-one to each of the frames between the scan periods of the lidar sensor 20, among the frames of the image, in step S60.

Therefore, the distance from the object for each of the first to 60th frames acquired by the camera 10 may be acquired.

As such, the object distance measurement apparatus and method in one form of the present disclosure may apply the vehicle operation information to the epipolar geometry to interpolate insufficient distance information due to a difference in refresh rate between image information acquired through the camera and lidar information acquired through the lidar sensor. Thus, the object distance measurement apparatus and method can conveniently measure a distance from an object at low cost, and acquire the effect of a stereo camera using one camera.

Although exemplary forms of the disclosure have been disclosed for illustrative purposes, those skilled in the art will appreciate that various modifications, additions and substitutions are possible, without departing from the scope and spirit of the present disclosure.

What is claimed is:

1. An object distance measurement apparatus comprising:
   a camera configured to capture an image of an area around a vehicle;
   a distance sensor configured to detect a distance from the vehicle to an object by scanning around the vehicle; and
   a distance measurement unit configured to:
   detect a vehicle moving distance based on vehicle information of the vehicle, and
   measure the distance from the object in response to each frame among frames of the captured image between first and second scan periods of the distance sensor, based on the vehicle moving distance which the vehicle moves in a period from the first scan period to the second scan period and location pixel coordinates of the object within captured images from the first scan period to the second scan period.

2. The object distance measurement apparatus of claim 1, further comprising a determination unit configured to:

compare a camera frequency of the camera with a scan frequency of the distance sensor, and determine whether to interpolate the distance from the object for each frame of the frames of the image.

3. The object distance measurement apparatus of claim 1, wherein the vehicle information comprises at least one of the vehicle moving distance, a steering angle, a vehicle speed, or a travel time.

4. The object distance measurement apparatus of claim 1, further comprising: a mapping unit configured to map the distance from the object, corresponding to each of the frames between the first and second scan periods of the distance sensor among the frames of the image, to each of the frames between the first and second scan periods of the distance sensor.

5. The object distance measurement apparatus of claim 1, wherein:

the distance measurement unit is configured to calculate the vehicle moving distance based on a moving distance, a steering angle and a moving angle among the vehicle information, received from an Electronic Control Unit (ECU) of the vehicle, and the vehicle moving distance is a length of a straight line connecting a first location of the vehicle in the first scan period to a second location of the vehicle in the second scan period.

6. The object distance measurement apparatus of claim 5, wherein:

the distance measurement unit is configured to generate a first virtual triangle including: a first side which is set to the calculated vehicle moving distance and a second side which is set to a radius of a virtual circle corresponding to a circular arc along which the vehicle moves, and the moving angle is calculated based on a length and the radius of the circular arc along which the vehicle moves, and the radius of the circular arc is determined based on the steering angle and previously stored information in a memory of the vehicle.

7. The object distance measurement apparatus of claim 6, wherein:

apexes of the first virtual triangle respectively correspond to a first location of the camera in the first scan period, a second location of the camera in the second scan period, and a location of a contact point between parallel lines tangent to a bumper of the vehicle in the first scan period and the bumper of the vehicle in the second scan period, respectively, when the parallel lines are extended toward an inside of the steering angle, the inside of the steering angle corresponds to an inside of the virtual circle when the vehicle moves in a circular arc shape.

8. The object distance measurement apparatus of claim 6, wherein when the first virtual triangle is generated, the distance measurement unit is configured to:

generate a second virtual triangle that shares one side with the first virtual triangle, and calculate the distance from the object based on information of the first virtual triangle.

9. The object distance measurement apparatus of claim 8, wherein the shared side of the second virtual triangle corresponds to a straight line connecting first and second locations of the camera of the vehicle in the first scan period and in the second scan period, among three sides forming the first virtual triangle, and apexes of the second virtual triangle are respectively set to the first location of the camera in the first scan period, the second location of the camera in the second scan period, and a center location of the object corresponding to a distance measurement target.

10. The object distance measurement apparatus of claim 8, wherein the distance measurement unit is configured to:

calculate a length of two sides among three sides forming the second virtual triangle by applying locations of the object in captured images by the camera in the first scan period and in the second scan period, to an epipolar geometry, and calculate, as the distance from the object, a length of a side corresponding to a straight line connecting a center location of the object to a location of the camera in the second scan period, among the three sides of the second virtual triangle.

11. The object distance measurement apparatus of claim 1, wherein the distance sensor includes a lidar sensor.

12. An object distance measurement method comprising:

capturing, by a camera, an image of an area around a vehicle;

sensing, by a distance sensor, a distance from an object to the vehicle by scanning around the vehicle; and detecting, by a distance measurement unit, a vehicle moving distance based on vehicle information of the vehicle, and measuring the distance from the object in response to each of frames between scan periods of the distance sensor, among frames of the captured image, based on the vehicle moving distance which the vehicle moves in a period from the first scan period to the second scan period and location pixel coordinates of the object within captured images from the first scan period to the second scan period.

13. The object distance measurement method of claim 12, further comprising:

comparing a camera frequency of the camera with a scan frequency of the distance sensor; and determining whether to interpolate the distance from the object for each frame of the frames of the image.

14. The object distance measurement method of claim 12, wherein the vehicle information comprises at least one of the vehicle moving distance, a steering angle, a vehicle speed, or a travel time.

15. The object distance measurement method of claim 12, further comprising:

mapping the distance from the object, corresponding to each of the frames between the first and second scan periods of the distance sensor among the frames of the image, to each of the frames between the first and second scan periods of the distance sensor.

16. The object distance measurement method of claim 12, further comprising:

calculating, by the distance measurement unit, the vehicle moving distance based on a moving distance, a steering angle and a moving angle among the vehicle information, received from an Electronic Control Unit (ECU) of the vehicle, and wherein the vehicle moving distance is a length of a straight line connecting a first location of the vehicle in the first scan period to a second location of the vehicle in the second scan period.

17. The object distance measurement method of claim 16, further comprising:

generating, by the distance measurement unit, a first virtual triangle including: a first side which is set to the calculated vehicle moving distance and a second side which is set to a radius of a virtual circle corresponding to a circular arc along which the vehicle moves, wherein the moving angle is calculated based on a length and the radius of the circular arc along which the vehicle moves, and the radius of the circular arc is determined based on the steering angle and previously stored information in a memory of the vehicle.

18. An object distance measurement apparatus comprising:
- a camera configured to capture an image of an area around a vehicle;
- a distance sensor configured to detect a distance from the vehicle to an object by scanning around the vehicle;
- a distance measurement unit configured to:
  - detect a vehicle moving distance based on vehicle information of the vehicle, and
  - measure the distance from the object in response to each frame among frames of the captured image between scan periods of the distance sensor, based on the vehicle moving distance and location pixel coordinates of the object within captured images from the first scan period to the second scan period; and
- a determination unit configured to:
  - compare a camera frequency of the camera with a scan frequency of the distance sensor, and
  - determine whether to interpolate the distance from the object for each frame of the frames of the image.

19. The object distance measurement apparatus of claim 18, wherein the vehicle information comprises at least one of the vehicle moving distance, a steering angle, a vehicle speed, or a travel time.

20. The object distance measurement apparatus of claim 18, further comprising: a mapping unit configured to map the distance from the object, corresponding to each of the frames between the first and second scan periods of the distance sensor among the frames of the image, to each of the frames between the first and second scan periods of the distance sensor.

* * * * *